United States Patent Office 3,382,064
Patented May 7, 1968

3,382,064
HIGH TEMPERATURE BEARING STEELS
Chester F. Jatczak, Canton, Ohio, assignor to The Timken Roller Bearing Company, Canton, Ohio, a corporation of Ohio
No Drawing. Filed Sept. 3, 1964, Ser. No. 394,313
7 Claims. (Cl. 75—123)

This invention relates to carburized bearing members for use up to 1000° F. and to high speed steels for the production of such bearings.

The term "bearing member" is used herein in the broad sense to refer to mettalic parts which move in contact with one another or with another part, particularly under conditions requiring a lubricant. The term is used with particular reference to roller bearings but contemplates also other members which move relative to another member in contact therewith, such for instance as ball bearings, gears, wrist pins and a variety of other rotating members.

The term "high speed steel" is used herein in its ordinary connotation of ability to retain properties, such as hardness, at high temperatures.

Bearings for use at or near room temperature have commonly been made from, for example, AISI 4600 carburizing steel or SAE 52100 through-hardening steel by oil quenching. These are limited in usefulness to a maximum temperature of about 350° F. A carburizing analysis patented by this applicant, No. 2,876,152, has been satisfactorily employed for bearing members at temperatures up to 600° F.

There is presently a demand for bearings which will operate satisfactorily at temperatures of the order of 1000° F. High speed tool steels of the H, T and M AISI categories have been tried in bearings at elevated temperatures, e.g. jet engines and gas turbines. These are heat resistant steels (high speed tool steels) which resist softening at temperatures up to 1100° F., chiefly because of their substantial contents of such alloying elements as tungsten, molybdenum, chromium and vanadium. For instane T-1 contains 18% W, 4% Cr, and 1% Ca; M-1 contains 1.5% W, 8% Mo, 4% Cr, and 1% Va; M-2, 6% W, 5% Mo, 4% Cr, 2% Va, etc. All of these steels are also high carbon compositions (e.g. 0.70 to 1.0%) and are through-hardening when quenched.

A variety of factors militate against the use of such steels for high temperature bearing meanufacture:

(1) Because of their high alloy and carbon contents they cannot be pierced into tubing which is the most desired and economical raw form for the manufacture of bearing members. Instead, bearings made from these steels must be machined totally out of solid bar stock. Since much more material must be machined this process is unduly expensive, and it is time-consuming and wasteful of steel. As far as I am aware, no steel in use for high temperature bearings up to 1000° F. has been pierced successfully into tubing.

(2) Also because of the high alloy and carbon contents, high speed steels are very expensive as well as being difficult to forge, machine, grind and anneal. Their usual annealed hardness range between 235 and 277 Brinell, whereas the industry is accustomed to machining the standard AISI 4600 and 52100 bearing steels at between 170 and 207 Brinell.

(3) Because the AISI high speed steels are through-hardening, that is, they harden throughout the section in small and large sections up to at least 4", they inherently produce the residual stress pattern characteristic of ordinary through-hardened steels, that is, tensile stresses on the surface and to a great depth, and compressive stresses near the center of the section. Surface tensile stresses are deleterious to rolling contact and bending fatigue life. The desired residual stress pattern for bearings and all similar quenched members is the reverse; i.e., compressive stresses on the surface and tensile stresses in the core or center section. Thus, the stress pattern developed in high speed steels after hardening detracts rather than enhances the fatigue life of bearings made therefrom. The desired stress pattern for bearing races has been for many years achieved automatically by the process of carburizing, wherein the high carbon case transforms last (after the interior) thus producing compressive residual stresses in the surface, or case layers.

(4) Because of their high alloy and carbon contents, high speed steels are also very difficult to heat treat— especially on a production basis. For instance, they must be hardened from temperatures in excess of 2200° F. with very close control of temperature and atmosphere. Actually, all of these steels must be hardened from temperatures which are higher than the temperatures at which they are forged. Thus heating and holding times of the order of 3 to 5 minutes must be scrupulously adhered to or ruined parts result. A steel permitting longer holding times would be certainly be great advantage.

The known high temperature high speed steels used presently or tried for bearings up to 1000° F. cannot be satisfactorily carburized because massive carbides and a carbide network form much too readily under all circumstances of carburizing between 1500° and 2100° F. This carburizing difficulty stems chiefly from the fact that all of the steels referred to contain at least about 4% Cr which (1) promotes the formation of the Kappa ($M_{23}C_6$) type carbides, which are brittle and whose habit is to precipitate as a continuous network in grain boundaries, and (2) produces a tight impermeable oxide; such factors interfere with normal carburizing in atmospheres containing carbon monoxide.

It is among the objects of this invention to provide carburizing bearing members adapted for continuous operation at temperatures up to 800° or 900° F., or for intermittent service at 1000° F. that are of a composition that can be pierced readily into tubing, soft annealed, say to not over about 192 Brinell, easily machined and heat treated after carburizing to possess high case, or surface, hardness at room temperature as well as case hardnesses after 1000 hours of service at 900° to 1000° F. of at least 62.5 and 55.0 Rockwell "C," respectively and which will carburize satisfactorily at the optimum hardening temperature so that parts can be single quenched, that is, hardened directly from the carburizing temperature.

Another object is to provide steels for high temperature bearings that develop high speed characteristics when carburized at and quenched from 2100° F., and which when tempered at 1050° F. provide hardness of $R_c$ 62.

A further object is to provide steel compositions for such bearing members that have satisfactory carburizing characteristics at 1700° F., the usual carburizing temperature for conventional bearing steels such as AISI 4600, so that the two-step treatment involving carburizing at 1700° F., quenching (e.g. in oil), and then reheating and quenching for hardening followed by tempering may be employed if desired or if so dictated by the available carburizing and heat treating equipment.

A still further object is to provide such members which provide hot hardness and recovered hardness after prolonged exposure up to 1000° F. sufficient in case and core to adapt them to continuous operation up to 900° F. and intermittent operation at 1000° F.

Another object is to provide carburizing grade steels for the production of bearing members in accordance with the foregoing objects, which within the carbon range of the invention will undergo secondary hardening as well as characteristically producing the desired residual stress pattern of compression on the surface and tension within, for best rolling contact and bending fatigue life of the bearing member.

Yet another object is to provide carburizing grade steels whose products of oxidation or reaction with lubricants or the atmosphere do not form abrasive or other deleterious particles.

Still another object is to provide steels and bearing members in accordance with the foregoing objects in which the predominant tendency is for the carbides to form only in the $M_6C$ type as rounded isolated particles rather than to form massive carbides or an objectionable continuous network in the grain boundaries.

Other objects will appear from the following specification.

The invention is predicated upon my discovery that its objects are attained with steels of the following composition, by weight:

Carbon 0.1 to 0.3 percent, chromium 0 to 1.0 percent, manganese, 0.2 percent to 1.0 percent, molybdenum 3.0 to 7.0 percent, silicon 0.2 to 0.6 percent, vanadium 0.25 to 0.85 percent, and the remainder iron together with impurities and residual elements in amounts normal to steels of this composition not adversely affecting the properties of the products of the invention.

For many purposes it is preferred that the steels contain 0.18 to 0.23 percent of carbon, 0.50 to 0.75 percent of chromium, 0.4 to 0.6 percent of manganese, 4.75 to 5.25 percent of molybdenum, 0.20 to 0.35 percent of silicon, and 0.50 to 0.75 percent of vanadium.

For most purposes it is preferred that the steels contain not over about 0.025 percent each of sulfur and phosphorus.

These steels are productive of $M_6C$ type carbides, which are spheroidal and do not deposit in the grain boundaries. They have excellent forging characteristics, and they can be pierced readily into tubing. They also produce very low annealed hardness and excellent machining characteristics. Furthermore, such steels may be carburized to between 0.80 to 1.0% surface carbon, and they produce the desired high temperature properties required for elevated temperature service up to 1000° F. in both case and core. These steels can be carburized directly at the optimum temperature for hardening, e.g. 2100° F., and hardened therefrom by air cooling or quenching in oil, or they can be first carburized at a lower temperature, say 1700° F., cooled to room temperature and then reheated for hardening in air or oil. In this way the objects of the invention are realized.

I have also discovered thta the $MoO_2$ oxide which is formed as an oxidation product on these materials after long exposure above about 800° F. in the presence of a lubricant is a solid state lubricant in its own right and thus may contribute to the lubrication of the bearing elements at high temperatures. By comparison, steels which contain high chromium produce hard abrasive particles that are unusually detrimental.

A particular, unusual and highly desirable feature of my new steels is that although they carburize readily at 1700 F. to be almost free of a tendency to form massive or network carbides, they can also be carburized directly in less time at the normal hardening temperature of 2100° F. and will then be capable of simple quenching in oil or in air. To the best of my knowledge these are the first high temperature steel compositions that can be carburized and hardened in this manner.

Although these new steels may be carburized at the 2100° F. hardening temperature, it may be preferable for some purposes to carburize at 1700° F. to 1750° F. to the desired case depth, oil quench, then reheat to 2100° F. in a non-oxidizing atmosphere or in a boric oxide bath, followed by an oil quench. A double temper of 2+2 hours at 1050° F. will then produce a hardness of $R_c$ 62 minimum with from nil to 10 percent retained austenite, depending on the surface carbon content.

These steels may be produced and processed in accordance with procedures known and used in the art for steels of generally similar composition. That is, they are preferably melted in electric furnaces or vacuum melted followed by forging, preferably at 2200° F., into rounds which are then pierced, preferably at 2150° F., using conventional tube mill apparatus and practice.

The tubes are then annealed and machined into bearings or other members which are then carburized and hardened to prepare them for use. This may be done with natural gas-air mixtures at, say, 1700° F., or with solid carburizing compounds at that temperature, for sixteen hours. Or, the steels may be carburized in 2 hours at 2100° F. with natural gas-air mixtures dried to a dew point that will form a 0.8% C case. As far as I am aware these steels are the first high speed steels that have been successfully carburized at 2100° F.

When carburized at 2100° F. the steels can be quenched directly from the carburizing temperature to develop hi speed properties. When tempered at about 1050° F. hardness of about $R_c$ 62 is developed. Or, if the steels are carburized at 1700° F. they may be oil quenched and reheated to 2100° F. and then air or oil quenched followed by tempering at 1050° F.

Decarburization will occur if hardening is performed in an open air furnace but this may be avoided by use of a protective atmosphere of 7° to 12° F. dew point, or by the use of a molten boric oxide bath.

The following compositions are analyses of heats typical of the invention, A, B, C and E to G representing the typical, or preferred, embodiment. Steel D the high carbon embodiment, and steels E to G variants of the typical steel:

| Steel | C | Cr | Mn | Mo | Si | V |
|---|---|---|---|---|---|---|
| A | 0.19 | 1.01 | 0.42 | 5.10 | 0.48 | 0.83 |
| B | 0.20 | 1.02 | 0.51 | 5.00 | 0.49 | 0.72 |
| C | 0.19 | 1.06 | 0.48 | 4.80 | 0.44 | 0.97 |
| D | 0.30 | 1.12 | 0.45 | 4.32 | 0.48 | 0.72 |
| E | 0.15 | 0.83 | 0.45 | 4.99 | 0.46 | 0.83 |
| F | 0.21 | 1.13 | 0.46 | 4.32 | 0.54 | 0.70 |
| G | 0.26 | 1.14 | 0.47 | 4.32 | 0.53 | 0.71 |

The following data are characteristic of the properties of such typical steels of this invention when melted and processed as described above.

As evidencing the annealing characteristics of these steels reference may be made to tests with typical steel C. The results of applying various annealing treatments were:

Brinell hardness
Cycle 1 heat to 1550° F., cool 10° F./hour to 1100° F. _____ 170
Cycle 2 heat to 1550° F., cool 20° F./hour to 1100° F. _____ 179
Cycle 3 heat to 1500° F. cool 50° F./hour to 1100° F. _____ 182
Cycle 4 heat to 1550° F., cool 100° F./hour to 1100° F. _____ 187
Cycle 5 heat to 1550° F., cool 150° F./hour to 1100° F. _____ 192

Since steels typical of the invention anneal to 192 Brinell they are easily machinable and can be annealed satisfactorily directly off the piercing mill.

Room temperature properties characteristic of the invention may be exemplified by typical steel C. The specimens were oil quenched from 2100° F. and tempered 2+2 hours at 1050° F., giving the following test results:

|  | 0.2% Yield Strength, p.s.i. | Ult. Tens. Strength, p.s.i. | Elong., Percent | Red. Area, Percent | Hardness Rc | |
|---|---|---|---|---|---|---|
|  |  |  |  |  | At Temp. | After Test |
| Room Temp | 172,500 | 214,500 | 13.5 | 46.0 | 45.5 | 45.5 |
| At 800° F | 146,000 | 182,400 | 12.5 | 45.0 | 40.0 | 45.5 |
| At 900° F | 138,500 | 179,000 | 13.4 | 41.5 | 40.0 | 45.0 |
| At 1,000° F | 128,000 | 168,000 | 12.5 | 32.0 | 38.0 | 45.5 |

These properties show that my new steels are at least equivalent or superior to the standard bearing steels, and that they retain their properties at high temperatures satisfactorily for bearing use.

In similar fashion typical steels A and C were carburized at 1700° F., oil quenched, reheated to 2100° F., oil quenched, and double tempered 2+2 hours at 1000° F. Properties determined were:

|  | Room Temperature Hardness After Indicated Times at Stated Temperatures | | |
|---|---|---|---|
|  | 250 hrs. | 500 hrs. | 1,000 hrs. |
| 0.8 C Case, 900° F | 62.5 | 62.5 | 62.5 |
| 0.19 C Core, 900° F | 46.5 | 46.5 | 46.0 |
| 0.8 C Case, 1,000° F | 60.0 | 58.0 | 55.0 |
| 0.19 C Core, 1,000° F | 41.0 | 36.0 | 31.5 |

Hardness as received—0.8 C case 63.0–62.5, 0.19 C core 46.5–47.0.

These data likewise reveal the desirable retention of properties at temperatures up to 1000° F., and they show that the case hardness of these typical steels will remain acceptable for long operation at least up to 9000° F.

Typical steel E was carburized at 1700° F., oil quenched, reheated to 2100° F., oil quenched, and tempered 2+2 hours at 1000° F. The specimens were then run at the following temperatures to determine hot hardnesses ($R_c$):

|  | Hardness as treated | Hardness at temperature | | Recovered Hardness after 1,000° F. |
|---|---|---|---|---|
|  |  | 800° F. | 1,000° F. |  |
| 0.8 C Case | 62.5 | 56.0 | 52.5 | 62.0 |
| 0.19 C Core | 47.0 | 39.5 | 38.0 | 47.0 |

These data show that the preferred, or typical, steels of the invention are suitable for continuous operation up to 800° or 900° F., when suitably lubricated, and for intermittent exposure at 1000° F. in service.

Investigation has shown that in the carburized, quenched and tempered steels of this invention the $M_{23}C_6$ carbide is not present up to a carbon level of 1.4%, that $M_6C$ is the primary carbide in the carburized and quenched microstructure until the case carbon exceeds 1.2%, and that although as much as 88% of austenite may be retained immediately after hardening, less than 10% is present after a double temper at 1050° F. These properties are, of course, most desirable in high temperature bearing steels.

These steels likewise develop desirable secondary hardening characteristics.

Microscopic examination has shown that the carburized regions of these steels will be exceptionally fine grained upon final hardening, again a plus factor in favor of my new steels.

I have found further that if the surface carbon (of the case) is kept below 1.0% after carburizing no austenite conditioning treatment will be required, i.e., no treatment will be needed to convert austenite to a transformation product to obtain full hardening.

If the preferred carbon range of 0.18 to 0.23 is used the core will contain about 30% of delta ferrite after hardening but this appears to be without significant affect upon either the room or the high temperature properties.

If a fully martensitic core structure is needed the carbon should be used at the upper limit rather than to accomplish this by the addition of other alloying elements, e.g., nickel.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. As a new article of manufacture, a case carburized steel bearing member formed from steel consisting essentially of about 0.1 to 0.3% of carbon, 0 to 1.0% of chromium, 0.2 to 1% of manganese, 3 to 7% of molybdenum, 0.2 to 0.6% of silicone, 0.25 to 0.85% of vanadium, and the remainder iron together with impurities and residual elements in amounts not adversely affecting the properties of steels of the said composition, the bearing member being characterized when carburized and hardened from 2100° F. by a case hardness of at least about 52.5 Rockwell "C" at 1000° F., and a recovered case hardness after 1000° F. for 1000 hours of about 62 Rockwell "C".

2. As a new article of manufacture, a case carburized steel bearing member formed from steel consisting essentially of about 0.18 to 0.23% of carbon, 0.5 to 0.75% of chromium, 0.4 to 0.6% of manganese, 4.75 to 5.25% of molybdenum, 0.2 to 0.35% of silicon, 0.5 to 0.75% of vanadium, and the remainder iron together with impurities and residual elements in amounts not adversely affecting the properties of steels of the said composition, the steel bearing member being characterized when carburized and hardened from 2100° F. by a case hardness of at least about 52.5 Rockwell "C" at 1000° F. and a recovered case hardness after 1000° F. for 1000 hours of about 62 Rockwell "C."

3. Carburizing steel consisting essentially of about 0.1 to 0.3% of carbon, 0 to 1% of chromium, 0.2 to 1% of manganese, 3 to 7% of molybdenum, 0.2 to 0.6% of silicon, 0.25 to 0.85% of vanadium, and the remainder iron together with impurities and residual elements in amounts not adversely affecting the properties of steels of the said composition, the steel being characterized when carburized and hardened from 2100° F. by a case hardness of at least about 52.5 Rockwell "C" at 1000° F., and a recovered case hardness after 1000° F. for 1000 hours of about 62 Rockwell "C."

4. Case carburizing steel consisting essentially of about 0.18 to 0.23% of carbon, 0.5 to 0.75% of chromium, 0.4 to 0.6% of manganese, 4.75 to 5.25% of molybdenum, 0.2 to 0.35% of silicon, 0.5 to 0.75% of vanadium, and the remainder iron together with impurities and residual elements in amounts not adversely affecting the properties of steels of the said composition, the steel being characterized when carburized and hardened from 2100° F. by a case hardness of at least about 52.5 Rockwell "C" at 1000° F., and a recovered case hardness after 1000° F. for 1000 hours of about 62 Rockwell "C."

5. An article according to claim 1, the article being a seamless tube.

6. An article according to claim 2, the article being a seamless tube.

7. A steel consisting essentially of .15–.3 carbon, .25–.85 vanadium, .2–1 manganese, 3–5 molybdenum, .2–.6 silicon, up to 1 chromium, and the balance essentially iron.

References Cited

UNITED STATES PATENTS

| | | | |
|---|---|---|---|
| 1,977,280 | 10/1934 | Kinzel | 75—122 |
| 2,275,785 | 3/1942 | McCarroll | 75—123 |
| 2,332,441 | 10/1943 | Fleischmtn | 75—126 |
| 2,354,147 | 7/1944 | Scott | 75—126 |

HYLAND BIZOT, *Primary Examiner.*

DAVID L. RECK, *Examiner.*

PAUL WEINSTEIN, *Assistant Examiner.*

UNITED STATES PATENT OFFICE
CERTIFICATE OF CORRECTION

Patent No. 3,382,064                                  May 7, 1968

Chester F. Jatczak

It is certified that error appears in the above identified patent and that said Letters Patent are hereby corrected as shown below:

Column 1, line 41, "Ca" should read -- Va --. Column 5, line 18, "A and C" should read -- A to C --.

Signed and sealed this 16th day of September 1969.

(SEAL)
Attest:

Edward M. Fletcher, Jr.                           WILLIAM E. SCHUYLER, JR.

Attesting Officer                                        Commissioner of Patents